(12) United States Patent
Soviero et al.

(10) Patent No.: US 9,759,273 B2
(45) Date of Patent: Sep. 12, 2017

(54) PISTON

(71) Applicants: Vincent Soviero, Holbrook, NY (US); Scott Wilson, Coram, NY (US)

(72) Inventors: Vincent Soviero, Holbrook, NY (US); Scott Wilson, Coram, NY (US)

(73) Assignee: Precision International Automotive Products, Inc., Yaphank, NY (US)

( * ) Notice: Subject to any disclaimer, the term of this patent is extended or adjusted under 35 U.S.C. 154(b) by 0 days.

(21) Appl. No.: 14/666,375

(22) Filed: Mar. 24, 2015

(65) Prior Publication Data

US 2016/0281793 A1 Sep. 29, 2016

(51) Int. Cl.
*F16D 25/0638* (2006.01)
*F16D 13/68* (2006.01)

(52) U.S. Cl.
CPC ........ *F16D 25/0638* (2013.01); *F16D 13/683* (2013.01)

(58) Field of Classification Search
CPC ........ F16D 11/14; F16D 21/00; F16D 13/683; F16D 13/52; F16D 13/646
See application file for complete search history.

(56) References Cited

U.S. PATENT DOCUMENTS

| | | | | |
|---|---|---|---|---|
| 2009/0170652 A1* | 7/2009 | Ishii | ............ | F16D 13/683 475/271 |
| 2012/0080284 A1* | 4/2012 | Torii | ............ | B21D 53/28 192/66.3 |
| 2012/0247906 A1* | 10/2012 | Kato | ............ | F16D 13/683 192/48.609 |
| 2012/0247907 A1* | 10/2012 | Kasuya | ............ | F16D 13/683 192/48.618 |
| 2015/0226276 A1* | 8/2015 | Heuver | ............ | F16D 13/52 188/152 |

* cited by examiner

*Primary Examiner* — David J Hlavka
(74) *Attorney, Agent, or Firm* — Scully, Scott, Murphy & Presser, P.C.

(57) ABSTRACT

The present disclosure is directed to clutches and pistons used therein. A multi-plate clutch includes a shaft configured to provide rotational movement about a central axis of the clutch, a drum, wherein the drum comprises an inner surface with a plurality of splines formed therein and an opening about the central axis configured to receive the shaft, a plurality of ring-shaped discs configured to engage with the splines and a piston, wherein the piston comprises a plurality of protrusions on an outer circumferential surface of the piston configured to engage with the splines and an opening about the central axis configured to receive the shaft.

6 Claims, 8 Drawing Sheets

PISTON

FIELD OF THE DISCLOSURE

The present disclosure is directed to a piston in a multi-plate clutch. The present disclosure is further directed to a C2 clutch piston that includes one or more protrusions about the outer periphery of the piston.

BACKGROUND OF THE DISCLOSURE

Typical multi-plate clutches operate by the pressing of a piston inside, a casing or drum, against a number of separator plates and friction plates to engage the clutch. The pressing of the friction plates between the separator plates causes the separator plates to engage a hub, which consequently transmits turning force from an input to an output.

In many transmissions the piston slowly spins or rotates within the drum when pressure is applied by the piston to the separator plates and friction plates and when the transmission as a whole vibrates. This spin or rotation causes the friction plates to undergo rotation and cause the friction material on them to wear down. This spin or rotation also causes the separator plates to overheat, causing "blue" discolorations in the material.

Figure 1:
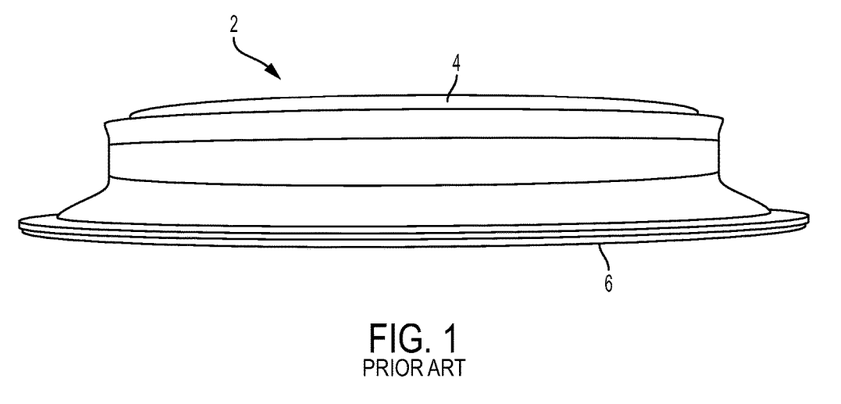
FIG. 1 is a side view of a prior art piston.
Figure 2:
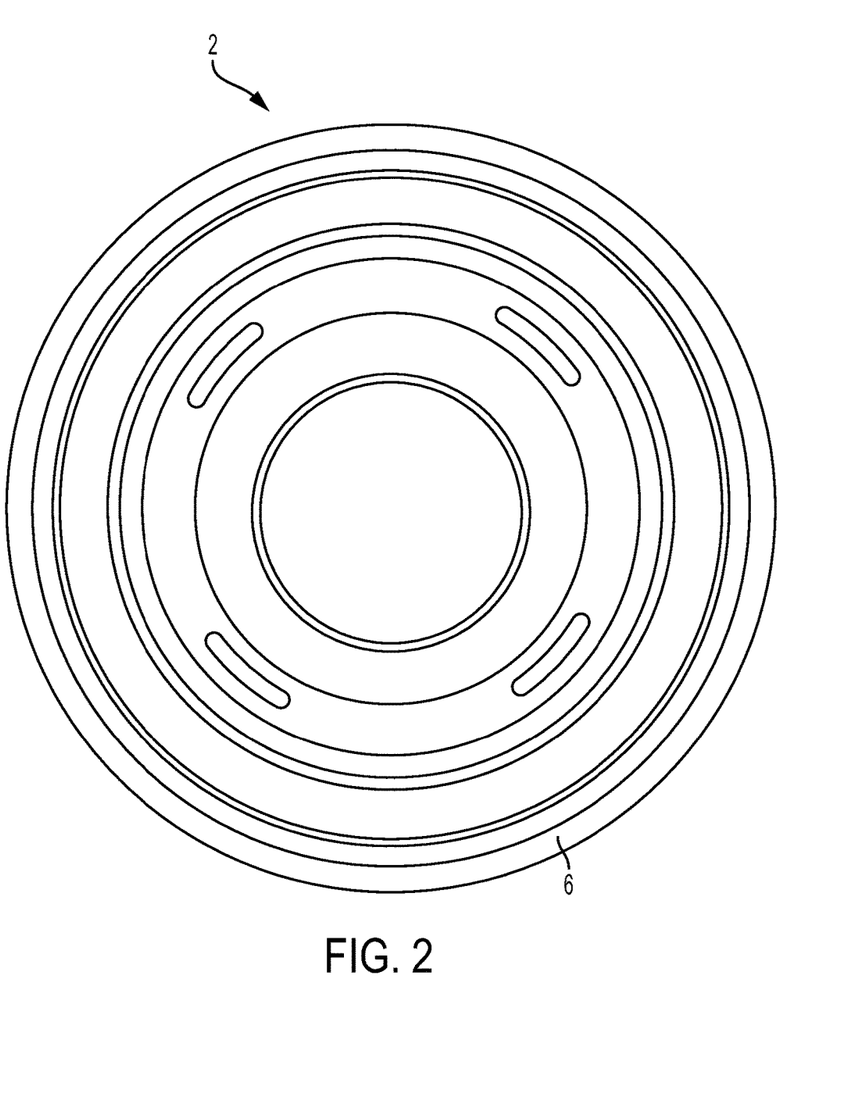
FIG. 2 is a top view of the prior art piston.

A typical piston 2 is shown in FIG. 1. As can be seen from this figure, piston 2 includes a first surface 4 configured to face the interior surface of a drum (not shown) and a second surface 6 configured to face one or more clutch plates. Another view of piston 2 is shown in FIG. 2, with second surface 6 visible. The outer circumferential surface of surface 6 is smooth and is capable or rotating or spinning within a drum during operation.

What is desired is a piston that will overcome these premature wearing issues in multi-plate clutches.

SUMMARY OF THE DISCLOSURE

The present disclosure is directed to clutches and pistons used therein. A multi-plate clutch includes a shaft configured to provide rotational movement about a central axis of the clutch, a drum, wherein the drum comprises an inner surface with a plurality of splines formed therein and an opening about the central axis configured to receive the shaft, a plurality of ring-shaped discs configured to engage with the splines and a piston, wherein the piston comprises a plurality of protrusions on an outer circumferential surface of the piston configured to engage with the splines and an opening about the central axis configured to receive the shaft.

BRIEF DESCRIPTION OF THE DRAWINGS

The present disclosure will be better understood by reference to the following drawings of which.

DETAILED DESCRIPTION OF THE DISCLOSURE

The disclosure includes a clutch and its components disposed within an automatic transmission of a vehicle. One of the components of the clutch is a piston, which is further discussed below.

As used herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

As used herein, the term "substantially" refers to the complete or nearly complete extent or degree of an action, characteristic, property, state, structure, item, or result. For example, an object that is "substantially" parallel would mean that the object is either completely parallel or nearly completely parallel. The exact allowable degree of deviation from absolute completeness may in some cases depend on the specific context. However, generally speaking the nearness of completion will be so as to have the same overall result as if absolute and total completion were obtained.

Figure 3:
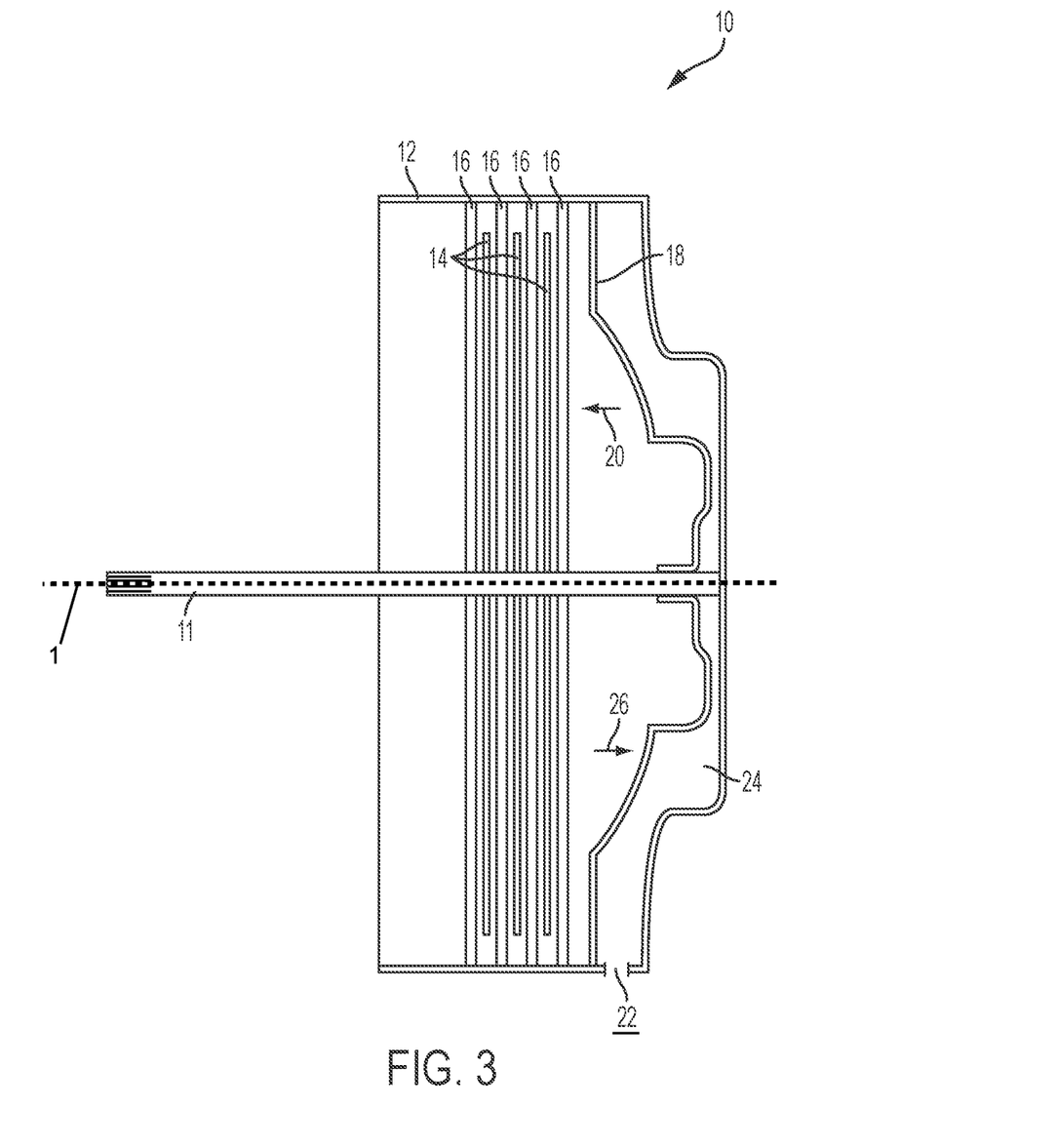
FIG. 3 is a cross section of a multi-plate clutch.

FIG. 3 illustrates a cross section of a multi-plate clutch 10. The clutch 10 is configured as a multi-plate friction hydraulic clutch. Clutch 10 includes a drum 12, a plurality of ring-shaped friction plates 14 and a plurality of ring-shaped separator plates 16. The separator plates 16 are maintained at their outer peripheral edge in a fitting engagement with the interior surface of drum 12 through splines (not shown) on the interior surface. The friction plates receive rotation from a shaft 11, about a central axis 1, in drum 12 through a planetary gear or the like (not shown).

Piston 18 is configured to press and against friction plates 14 and separator plates 16 to engage clutch 10 to transmit rotation between drum 12 and a hub (not shown), between which there is relative rotation. Piston 18 is moved in direction 20 by a pressurized fluid, for example oil, that enters case 12 through oil hole 22 into oil compartment 24. Piston 18 moves in direction 20 and engages clutch 10 by pressing each of the plurality of separator plates 16 and friction plates 14 together so that the rotation of friction plates 14 is transmitted to the separator plates 16, causing the separator plates 16 to also rotate, which causes rotation of drum 12.

When the clutch 10 is disengaged, the oil is discharged from oil compartment 24 through oil hole 22 and the piston 18 moves in direction 26 with the aid of a return spring or the like (not shown). Once piston 18 is moved in direction 26 and the clutch 10 is disengaged, the plurality of friction plates 14 can then rotate independently of the plurality of separator plates 16 so that drum 12 is not caused to rotate.

Although not clear from FIG. 3 piston 18 is configured to engage with the splines on the interior surface of drum 12. This feature of piston 18 will be further discussed below.

Figure 4:
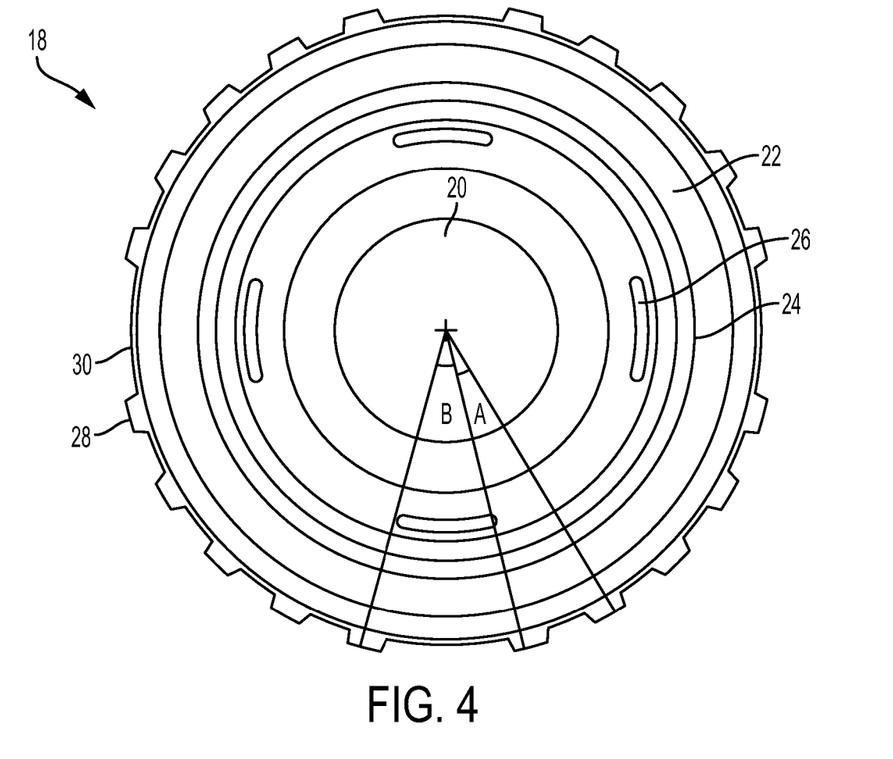
FIG. 4 is a top view of a piston of the present disclosure.

FIG. 4 is a view of piston 18 from the direction of separator plates 16 and friction plates 14 in FIG. 3. As can be seen from FIG. 4, piston 18 includes an opening 20 about the central axis of piston 18 so that a shaft can pass therethrough Annular rings such as ring 24 are illustrated along interior surface 22 of piston 18, but these annular rings can be modified in shape and location based on the specific clutch piston 18 is incorporated in. Further, other elements such as along the interior surface 22 such as projection 26 and the other illustrated projections can also be modified in shape and location based on the specific clutch piston 18 is incorporated in. The features on interior surface 22, including ring 24 and projection 26 are also optional if the specific clutch piston 18 is incorporated in is not configured for these features.

Also shown in FIG. 4 are a number of protrusions 28 extending from the outer circumferential surface 30 of piston 18. Although twenty protrusions 28 are shown in FIG. 4, this number can be modified based on the specific clutch piston 18 is incorporated into. For example, piston 18 can include one to nineteen protrusions or twenty one or more protrusions extending from the outer circumferential surface 30 of piston 18. Further, the dimensions of each of the protrusions 28 and location on the outer circumferential surface 30 of each of protrusions 28 can be modified based on the specific clutch piston 18 is incorporated into. For example in FIG. 4, angle A is about 15° between each of the more closely located protrusions 28 and angle B is about 30° between each of the protrusions 28 that are further spaced apart.

Each protrusion 28 that is further spaced apart by angle B allows for less material to be included in piston 18, which subsequently reduces the weight of piston 18. Thus, the number of protrusions 28 can be reduced from what is illustrated in FIG. 4 to further reduce the weight of piston 18, as desired.

Figure 5:
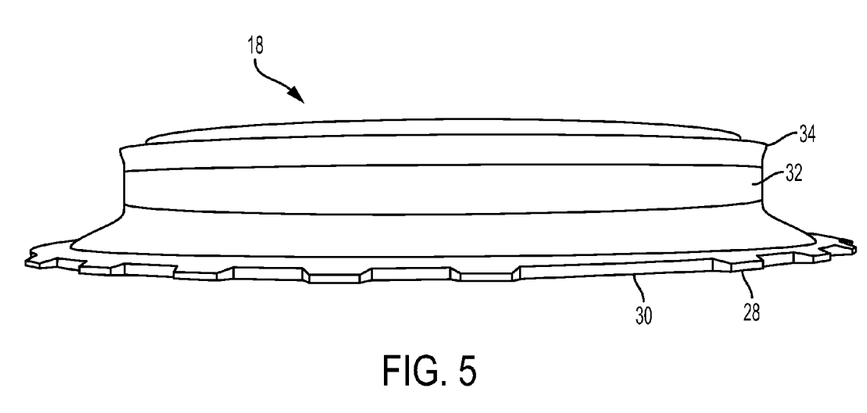
FIG. 5 is a side view of a piston of the present disclosure.

FIG. 5 is a side view of piston 18 such that the external surface 32 is visible. In this figure piston 18 is resting on its surface that faces separator plates 16 and friction plates 14 in FIG. 3.

As can be seen from FIG. 5, the external surface 32 of piston 18 can include annular rings such as ring 34, but these annular rings can be modified in shape and location based on the specific clutch piston 18 is incorporated in. The features on exterior surface 32, including ring 34 are also optional if the specific clutch piston 18 is incorporated in is not configured for these features.

Figure 6:
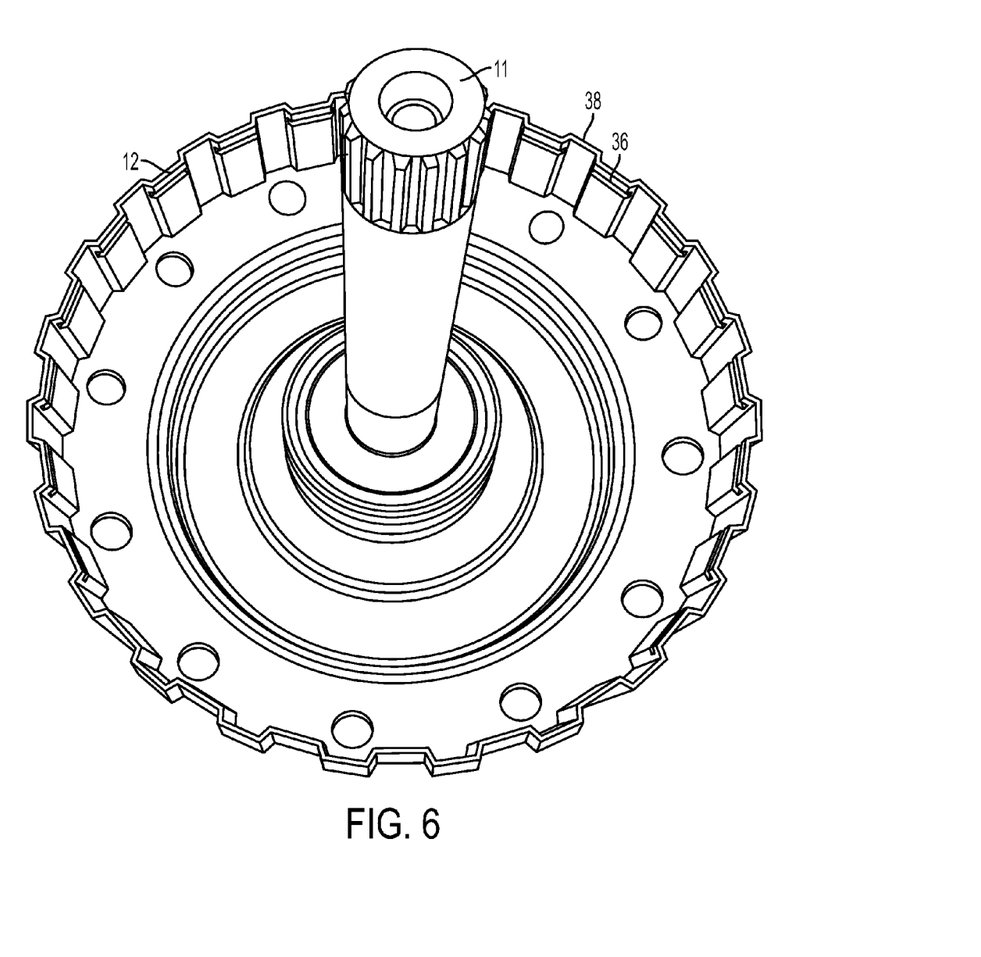
FIG. 6 is a perspective view of a drum.

FIG. 6 illustrates one example of a drum 12 that can be used in conjunction with piston 18. In FIG. 6 drum 12 is shown such that shaft 11 and the interior surface 36 of drum 12 are visible. In this example of drum 12 a plurality of splines 38 are formed in interior surface 36. In other drums, one spline or many splines can be formed in interior surface 36. Shaft 11 and drum 12 rotate about the central axis of the clutch.

Figure 7:
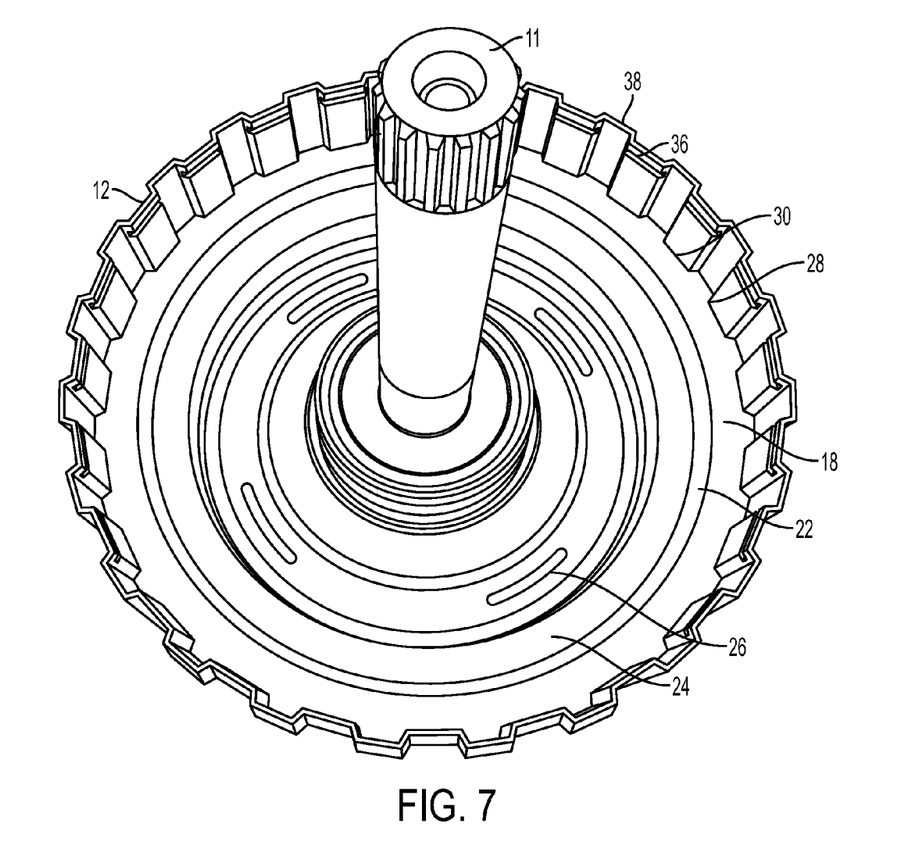
FIG. 7 is a perspective view of a drum and a piston of the present disclosure.
Figure 8:
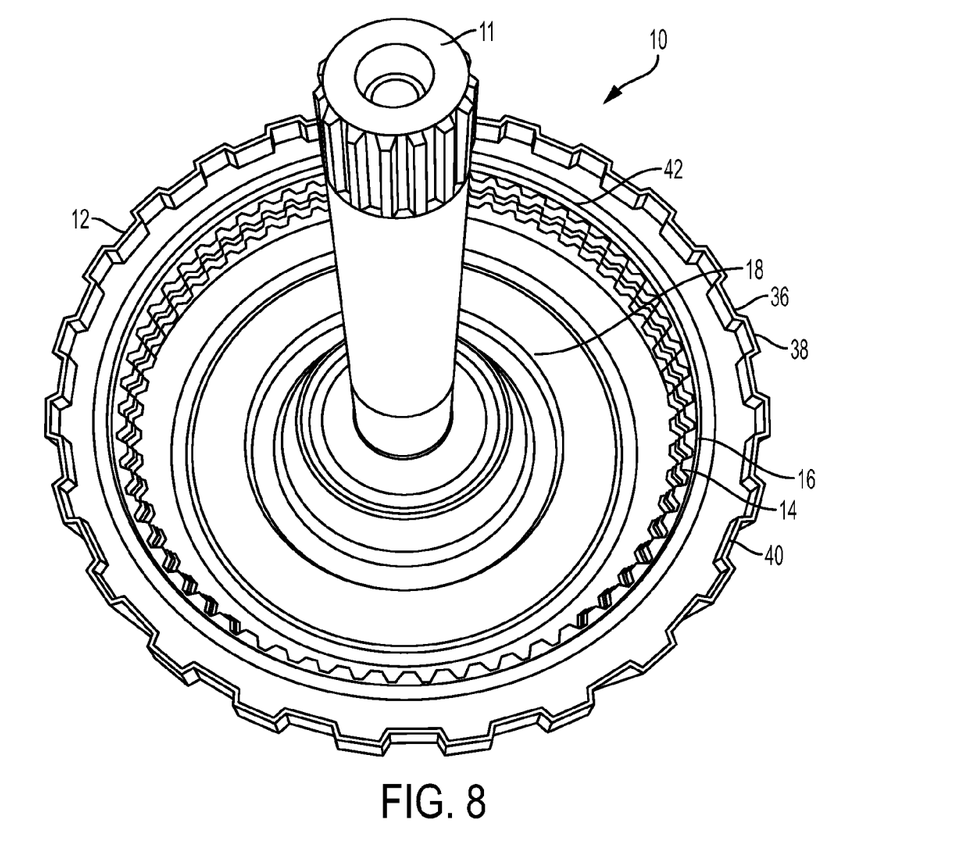
FIG. 8 is a perspective view of a drum, a piston of the present disclosure and a plurality of rings disposed within the drum.

FIG. 7 illustrates the placement of piston 18 into drum 12, similar to the configuration illustrated in FIG. 3. As can be seen in FIG. 7, the protrusions 28 of piston 18 are configured to substantially engage with and substantially extend into the splines 38. Because the protrusions 28 of piston 18 substantially engage with and substantially extend into the splines 38, the rotation of piston 18 relative to drum 12 is inhibited. The protrusions 28 of piston 18 remain substantially engaged with and substantially extended into the splines 38 during operation, which includes movement of piston 18 along shaft FIG. 8 illustrates placement of separator plates 16 and friction plates 14 in drum 12, along with piston 18, similar to the configuration illustrated in FIG. 3. As can be seen in FIG. 8, the separator plates 16 also include plate protrusions 40 that are configured to substantially engage with and substantially extend into the splines 38. The friction plates 14 are shown with friction protrusions 42 that extend from the inner circumferential surface of friction plates 14 toward shaft 11.

In clutch 10 of FIG. 8, because the plate protrusions 40 substantially engage with and substantially extend into splines 38, the rotation of separator plates 16 relative to drum 12 is inhibited. In this embodiment, the protrusions 28 of piston 18 also inhibit the rotation of piston 18 relative to separator plates 16.

Clutch 10 can be incorporated with any suitable automatic transmission for any vehicle, including automobiles and motorcycles. For example, clutch 10 can be incorporated with various Aisin® AW transmissions, such as the TF60SN (09G), TF61SN (09K) and TF62SN (09M) transmissions. Further, clutch 10 can be incorporated as any clutch within an automatic transmission, such as the first clutch (C1) or the second clutch (C2, also known as a K2 clutch) of a transmission having at least two clutches, such as a dual clutch automatic transmission. Further description of the C1 and C2 clutches is provided on the following website: http://www.automaticchoice.es/Catalogo%20AC/Catalogue/tf60sn.pdf, which is hereby incorporated by reference.

In one embodiment, clutch 10 can be incorporated in a suitable automatic transmission in a front wheel drive vehicle, in other embodiments clutch 10 can be incorporated in a suitable transmission in a rear wheel drive vehicle, in other embodiments clutch 10 can be incorporated in a suitable transmission in an all wheel drive or four wheel drive vehicle. In one embodiment, clutch 10 can be incorporated into a Volkswagon® vehicle, an Audi® vehicle, a SEAT® vehicle, a BMW® vehicle or a Skoda® vehicle. The transmissions in these vehicles can include four or more gears, such as six or eight gears, or more.

Each of the components discussed above, including drum 12 and piston 18, can be formed of any suitable material, such as one or more metals or one or more carbon based materials such as carbon fiber.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

What is claimed is:

1. A multi-plate clutch comprising:
a shaft configured to provide rotational movement about a central axis of the clutch;
a drum, wherein the drum comprises an inner surface with a plurality of splines formed therein and a drum opening about the central axis configured to receive the shaft;
a plurality of ring-shaped discs configured to engage with the splines; and
a piston, wherein the piston comprises a plurality of unevenly spaced protrusions on an outer circumferential surface of the piston configured to engage with the splines, and a piston opening about the central axis configured to receive the shaft, wherein a first portion of the plurality of unevenly spaced protrusions are spaced about 15° apart from one another on the outer circumferential surface of the piston and a second portion of the plurality of unevenly spaced protrusions are spaced about 30° apart from one another on the outer circumferential surface of the piston.

2. The multi-plate clutch of claim 1, wherein the second portion of the plurality of unevenly spaced protrusions does not include protrusions within the about 30° on the outer circumferential surface of the piston.

3. The multi-plate clutch of claim 2, wherein the plurality of unevenly spaced protrusions comprises a first set of five protrusions, a second set of five protrusions, a third set of five protrusions and a fourth set of five protrusions, and wherein each set is separated by about 30° on the outer circumferential surface of the piston.

4. A piston configured to be within a multi-plate clutch, the piston comprising:

an opening about a central axis that is configured to receive a shaft;

a plurality of unevenly spaced protrusions on an outer circumferential surface of the piston configured to engage with splines on an inner surface of a drum, wherein a first portion of the plurality of unevenly spaced protrusions are spaced about 15° apart from one another on the outer circumferential surface of the piston and a second portion of the plurality of unevenly spaced protrusions are spaced about 30° apart from one another on the outer circumferential surface of the piston.

5. The piston of claim 4, wherein the second portion of the plurality of unevenly spaced protrusions does not include protrusions within the about 30° on the outer circumferential surface of the piston.

6. The piston of claim 5, wherein the plurality of unevenly spaced protrusions comprises a first set of five protrusions, a second set of five protrusions, a third set of five protrusions and a fourth set of five protrusions, and wherein each set is separated by about 30° on the outer circumferential surface of the piston.

\* \* \* \* \*